United States Patent Office 3,435,187
Patented Mar. 25, 1969

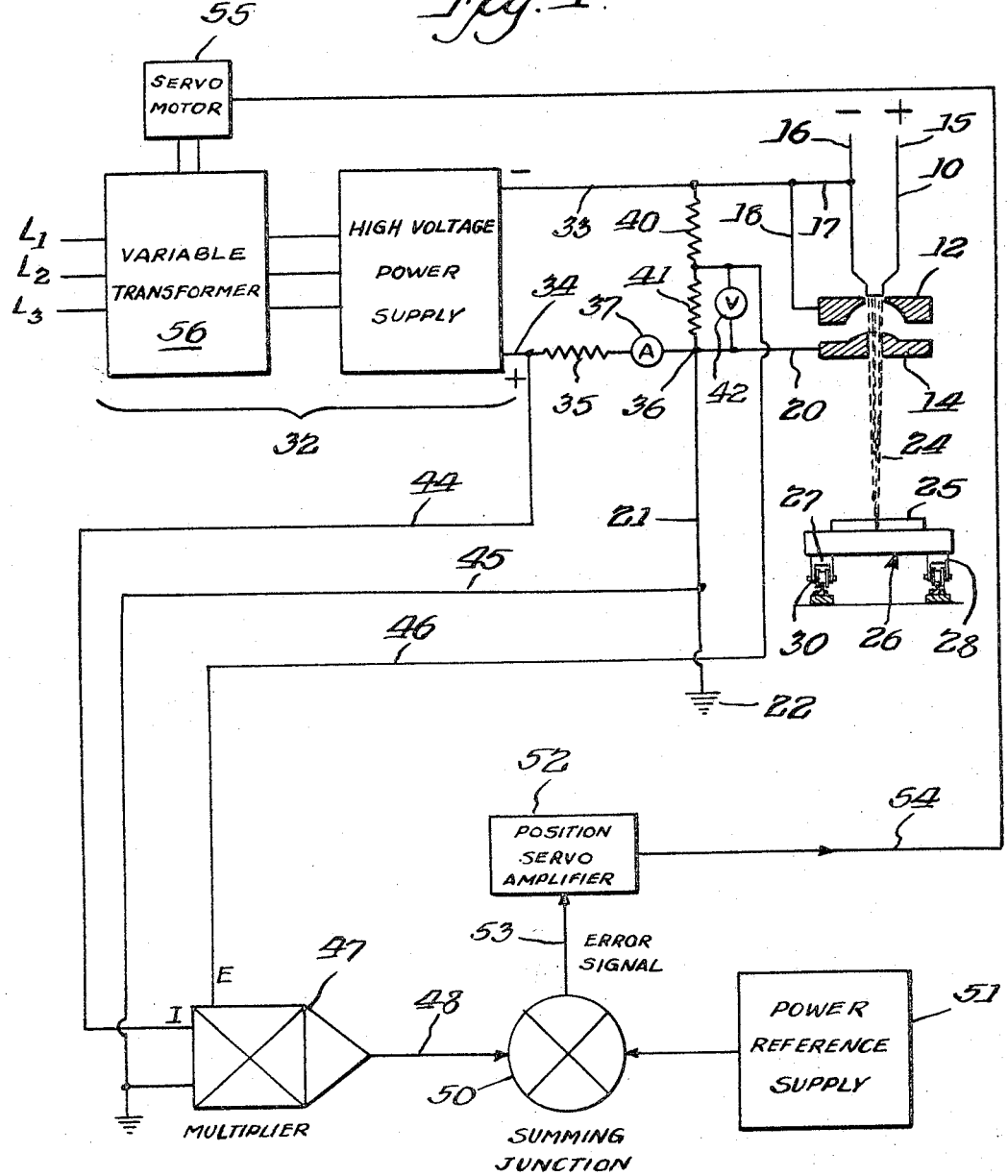

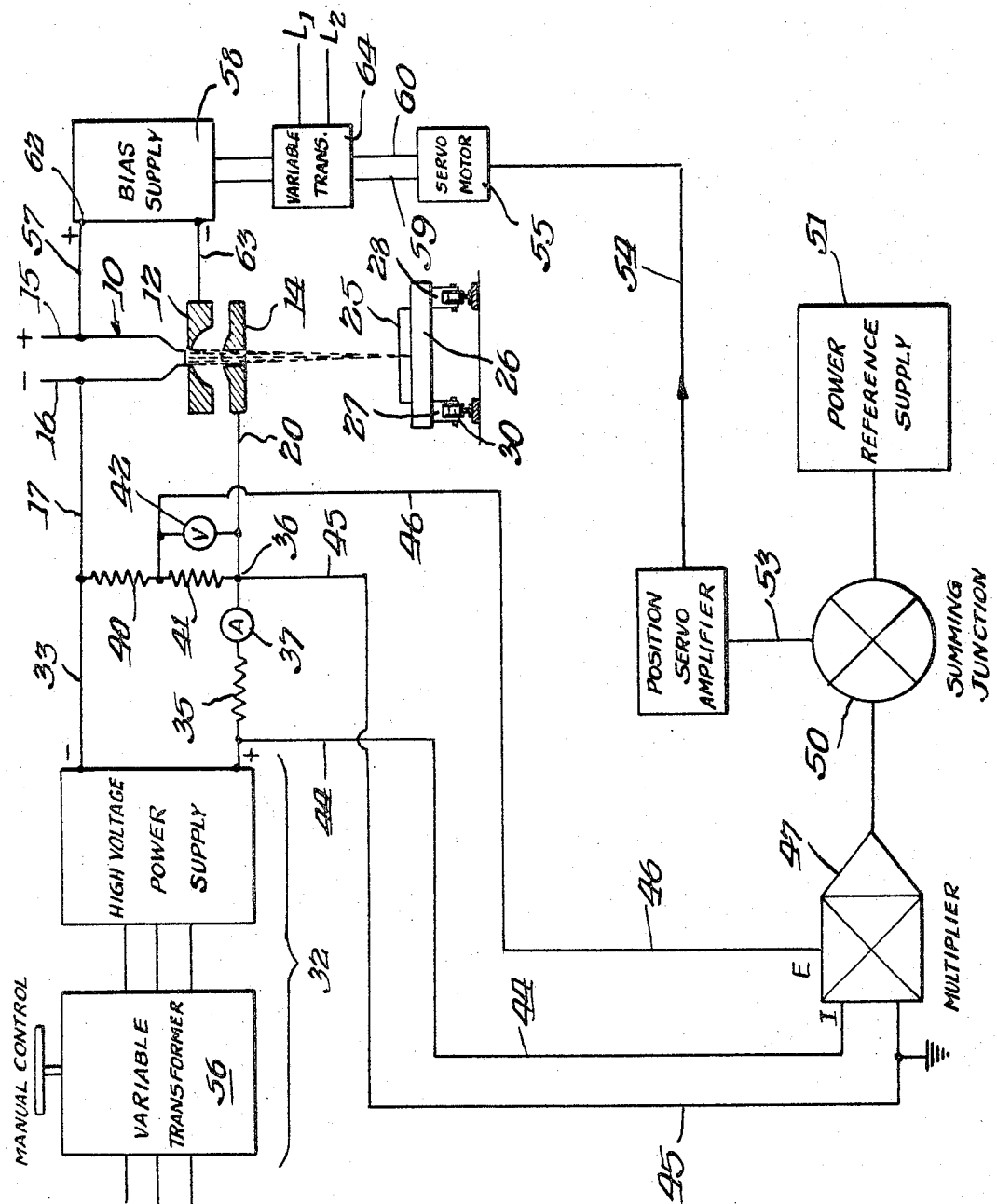

3,435,187
ELECTRON BEAM WELDING METHOD WITH
FEED BACK CONTROL
David Sciaky, Chicago, Ill., assignor to Welding Research,
Inc., Chicago, Ill., a corporation of Illinois
Filed July 14, 1966, Ser. No. 565,177
Int. Cl. B23k 9/10
U.S. Cl. 219—121                                             7 Claims The invention relates to electron beam welding and has reference in particular to an electron beam welding system having feed back control for maintaining the beam power constant and uniform for any preset value notwithstanding current or voltage variations or changes in the perveance of the electron gun.

In the known methods of electron beam welding a high voltage power supply of the regulated type is utilized and the high voltage is maintained at any desired level by means of a feed back regulator. Changes in the line voltage or changes in the load do not result in any changes in the high voltage accelerating potential. However, because of the peculiarities of the electron gun acting in an atmosphere of gas and metal vapors liberated and created by the electron beam during the welding operation, it is found that although the accelerating potential may be maintained constant the electron beam current will vary. Any changes which affect the perveance of the gun will change the electron beam current. Accordingly, even though the accelerating voltage is held constant, the total power which is the product of the accelerating voltage and the electron beam current will vary. Any variation in electron beam power will cause a variation in the welding rate and also a variation in the depth of the weld. An irregular and unsatisfactory weld is the result.

In order to maintain constant and uniform the power which the electron beam delivers to the workpiece, the present invention provides for the regulation of the power being delivered to the workpiece, rather than only regulating and maintaining constant the accelerating potential. In the method as contemplated, the electron beam current and the accelerating voltage are both continuously sampled and fed to an electronic multiplying device. The output of the multiplier, which is the product of the beam current and the accelerating potential and is a direct function of the power or wattage supplied to the work, is then fed to a summing junction of a feedback regulator. A reference signal is also fed to the summing junction which is proportional to the power which is desired during the welding operation. In the event there is a difference in the two signals, then an error signal is produced and the same is utilized to control the voltage output of the high voltage supply. The electron beam current delivered by the electron gun follows the law $I=KE^{3/2}$ and therefore as the voltage increases the current will increase in proportion to the 3/2 power of the change in voltage. The error signal acting through a feedback amplifier which controls a position servo mechanism will adjust the high voltage supply to such a voltage that the product of the current and the voltage again equal the power desired.

Accordingly, the main objective of the invention is to provide a method of electron beam welding wherein a voltage proportional to the magnitude of the actual beam power is matched against a voltage proportional to the magnitude of the power desired and wherein an error signal is produced representing any difference between the two voltages. The error signal is then used to regulate the high voltage supply source. In such a method the beam power can be maintained uniform and constant for the most satisfactory welding notwithstanding variations in filament current, in the voltage of the power supply line and changes in the perveance of the electron gun.

With these and various other objects in view the invention may consist of certain novel features of construction and operation as will be more fully described and particularly pointed out in the specification, drawings and claims appended thereto.

In the drawings which illustrate an embodiment of the device and wherein like reference characters are used to designate like parts:

FIGURE 1 is a diagrammatic view showing an electronic control circuit for regulating the beam power of electron guns in accordance with the invention; and FIGURE 2 is another diagrammatic view showing a modified form of electronic control circuit coming within the invention.

Referring to FIGURE 1 of the drawings it will be observed that the electron gun is illustrated as comprising the filament 10, the negative electrode 12 and the anode 14. The filament 10 is electrically connected by the conductors 15 and 16 to a source of direct current and the negative terminal of the source is connected by the conductors 17 and 18 to the negative electrode 12. The electrode 12 is thus maintained at a high negative potential. The anode 14 is electrically connected by the conductors 20 and 21 to the ground as at 22 so that the anode is at ground potential and which is positive with respect to the electrode. The electron beam 24 is focused and caused to impinge on the workpiece 25 which is carried by the carriage 26. The wheels 27 of the carriage which are journalled by the depending supports 28 mount the carriage 26 for rolling movement on the tracks 30. The workpiece and carriage are grounded to the frame of the machine through the wheels and supports.

For a more complete understanding of the structure and mode of operation of an electron beam gun reference is made to the Sciaky Patent 3,187,216, granted June 1, 1965 and entitled "Electron Gun Having a Releasably Clamped Electron Emitting Element."

The high voltage power regulator designated by the numeral 32 supplies a direct current of high voltage for maintaining the required electrical field between the electrode 12 and the anode 14. The power regulator is electrically connected to the power supply line by the conductors $L_1$, $L_2$ and $L_3$. The conductor 33 has connection with the negative terminal of the direct current leads for the filament 10. The negative terminal of the high voltage power supply is thus connected by conductors 33 and 17 to one side of the filament and by the conductor 18 to the negative electrode 12. The positive terminal of the high voltage power supply is connected by conductor 34 to one end of current measuring resistor 35 which has its other end connected at 36 to conductor 20 and thus to the anode 14. The ammeter 37 is connected in series with the resistor 35. Conductors 20 and 21 connect the anode to the frame of the machine and to the ground.

Resistors 40 and 41 comprise a voltage divider which is placed across the conductors 33 and 20 and is thus measuring the potential existing between the electrode 12 and the anode 14, which is the accelerating potential of the electron beam gun. A fixed portion of this voltage appears across resistor 41 and is visually indicated by voltmeter 42. When the electron beam is energized all the current which is delivered by the high voltage power supply passes through current measuring resistor 35. The voltage developed across the resistor 35 is a measure of the total current being supplied by the high voltage power supply to the electron beam gun and the work.

The connection of the anode 14 with the high voltage power regulator is such that an accelerating potential is applied to the anode 14 and the relationship between the resulting beam current and voltage is expressed mathematically as $I=KE^{3/2}$ where K is a constant, I is the electron beam current and E is the accelerating potential. From the equation it will be understood that should the accelerating potential vary, the electron beam current will vary according to the 3/2 power of the accelerating potential.

It has previously been stated that any change which affects the perveance of the electron gun will produce a change in the electron beam current. For example, the electron beam current will varry should the position of the filament change due to the heating of the filament or due to the heating up of the parts of the gun. The pressure of the rarified atmosphere surrounding the filament is also critical. Likewise the type of gas or vapor which may find its way into the space between the negative electrode and the anode will also affect the perveance of the gun. Thus the electron beam current will change as different metals are being welded due to the difference in the neutralization of the space charge by the different metal ions. The current when welding copper will be greater than when welding steel.

The invention seeks to maintain constant and uniform the beam power being delivered for welding purposes and in accordance therewith the current measuring resistor 35 and the resistors 40 and 41 of the voltage divider are electrically connected by the conductors 44, 45 and 46 to an electronic multiplying device 47. The current and voltage of the electrical energy being supplied by the high voltage power regulator are thus continuously sampled and fed to the multiplying device 47. The said device in effect multiplies the measured values of the current and the voltage so that the output of the device is a function of the power supplied to the workpiece by the electron beam. The output of the multiplier is delivered by the conductor 48 to a summing junction 50. The reference power device 51 also feeds a signal to the summing junction, which, however, is proportional to the power desired for the electron beam during the welding operation. Whereas the multiplier supplies a signal to the summing junction which is proportional to the actual power, the signal supplied by the reference power device 51 is proportional to the power desired. Should there be a difference in these two signals, an error signal is produced by the summing junction and which is fed to the position servo amplifier 52 by the conductor 53. From the amplifier the error signal is delivered by the conductor 54 to the servo motor 55 which controls the position of the variable transformer 56 which is a part of the high voltage regulator 32. This amplified error signal regulates the high voltage power regulator and thus controls the voltage output of the same. In other words, the voltage output of the high voltage regulator is adjusted by the error signal to such a voltage that the product of the current and the voltage again equals the power desired.

By thus controlling the regulator 32, the power of the electron beam during the welding operation is maintained constant and uniform. The desirable result is obtained notwithstanding changes in the perveance of the electron gun and variatios which may occur in the line voltage or current. By thus supplying energy to the workpiece at a constant and uniform rate the material melted per unit of time is a constant and the weld will, therefore, be uniform in all respects and satisfactory in quality.

FIGURE 2 illustrates another electronic control circuit coming within the invention. In this system the electron beam gun is also of the triode type, comprising a filament, a separate control electrode, and an anode. In the electron gun of FIGURE 2 the accelerating potential is maintained fixed, being supplied from the negative terminal of the high voltage power supply through lines 33 and 17 to the filament leg 16 and from the positive terminal 34 of the high voltage power supply through current measuring resistance 35 and conductor 20 to the anode 14. The acceleration potential may be adjusted to some desired preset level by means of the variable transformer 56 which may be manually controlled or may have a simple motor control which would allow the variable transformer output voltage to be increased or decreased as desired.

With the accelerating potential maintained at some preset level, the electron beam current supplied by the gun to the work may be adjusted in magnitude by applying a suitable direct current potential between the filament and the cathode electrode 12, the cathode electrode being set to a negative potential with respect to the filament. By varying the negative potential applied to the control electrode between zero and some upper magnitude, the electron beam current may be varied from zero to its upper limit, as is determined by the filament and the spacing between the electrodes and the acceleration potential. The necessary potential to supply the control electrode is obtained from the bias supply 58. The positive terminal 62 of this bias supply is connected by conductor 57 to the filament lead 15. The negative terminal of the bias supply is connected to the control electrode 12 by conductor 63. Variable transformer 64, which is fed from the power supply line $L_1$ and $L_2$, delivers an alternating current for powering the bias supply through conductors 59 and 60. The magnitude of this AC voltage may be varied by shifting the position of the servo motor 55.

When the system operates in accordance with the method of the invention, the analog of the current, which is measured between conductors 44 and 45, and the analog of voltage measured between conductors 45 and 46, is fed to the electronic multiplier 47. At the summing junction, the product of the current and voltage, or wattage, is matched with the preset power voltage reference representing the power desired in the electron beam and the difference or error signal is delivered to the position servo amplifier 52 which adjusts the position of the servo motor 55 so that the bias voltage applied between the control electrode and the filament is at such a level that the resulting current in the electron beam times the accelerating potential will equal the desired preset level of power. In this system should the line voltage $L_1$, $L_2$ and $L_3$ vary, a condition which would normally cause the current to vary according to the 3/2 power and therefore change the power in the beam, the power feedback system can automatically change the bias voltage. Thus no matter what changes occur in line voltage or in the mechanical spacing of the gun elements the bias is so adjusted as to maintain the power constant.

Although the bias supply in FIGURE 2 is shown to be supplied by a variable transformer which is controlled by the servo motor, the system may also be operated by means of a fully electronic feedback controlled bias supply which requires no variable transformer or motor.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. An electron beam welding method wherein an electron gun projects an electron beam into contact with a workpiece for welding the same, the steps which comprise maintaining an electrical field between the electrode and the anode of the gun by supplying electrical energy to the parts from a high voltage direct current source, feeding representative values of the voltage and current of said electrical energy to a multiplier, obtaining from said multiplier a signal which is thus proportional to the power being supplied by the electron beam to the workpiece, feeding said signal to a summing junction, feeding to the summing junction a second signal which is proportional the power desired for the electron beam, obtaining from said summing junction an error signal representing the difference between the two signals, and utilizing the error signal to adjust the voltage of the electrical energy being supplied to the parts so that the product of the current and the voltage will equal the power desired for the electron beam.

2. An electron beam welding method wherein an electron gun projects an electron beam into contact with a workpiece for welding the same, the steps which comprise maintaining the desired electrical field between the electrode and the anode of the gun by connecting the parts respectively to the negative and positive terminals of a high voltage direct current regulator, feeding representative values of the voltage and current of the electrical energy being supplied by the regulator to a multiplier and obtaining a signal which is thus proportional to the power being supplied by the electron beam to the workpiece, feeding said signal to a summing junction, feeding to said summing junction a second signal which is proportional to the power desired for the electron beam, obtaining from the summing junction an error signal representing the difference between the two signals, and utilizing the error signal to control the direct current regulator in a manner whereby the voltage of the electrical energy being supplied by the regulator is adjusted so that the product of the current and the voltage will equal the power desired for the electron beam.

3. In welding apparatus of the character described, the combination with an electron gun for projecting an electron beam for welding a workpiece, said gun having an electrode and an anode, a high voltage power regulator, conductors connecting the power regulator with the electrode and with the anode, respectively, for supplying electrical energy to said parts, an electrical multiplier, means supplying representative values of the voltage and the current of said electrical energy to the multiplier, whereby to obtain a first signal from the multiplier proportional to the power being supplied by the electron beam to the workpiece, a summing junction electrically connected to the multiplier for receiving said first signal, means for feeding to the summing junction a second signal which is proportional to the power desired for the electron beam, a position servo amplifier, a conductor for feeding to the amplifier any error signal such as may be obtained from the summing junction, and means in electrical connection with the position servo amplifier for adjusting the high voltage power regulator in response to the error signal so that the product of the current and the voltage will equal the power desired for the electron beam.

4. In welding apparatus of the character described, the combination with an electron gun for projecting an electron beam for welding a workpiece, said gun having an electrode and an anode, a high voltage power regulator, conductors connecting the power regulator with the electrode and with the anode, respectively, for supplying electrical energy to said parts, an electrical multiplier, means supplying representative values of the voltage and the current of said electrical energy to the multiplier, whereby to obtain a first signal from the multiplier proportional to the power being supplied by the electron beam to the workpiece, a summing junction electrically connected to the multiplier for receiving said first signal, a power reference supply for feeding to the summing junction a second signal which is proportional to the power desired for the electron beam, a position servo amplifier, a conductor for feeding to the amplifier any error signal such as may be obtained from the summing junction, and a servo motor in electrical connection with the servo position amplifier for adjusting the high voltage power regulator in response to the error signal so that the product of the current and the voltage will equal the power desired for the electron beam.

5. An electron beam welding method wherein an electron gun projects an electron beam into contact with a workpiece for welding the same, the steps which comprise maintaining the desired electrical field between the electrode and the anode of the gun by connecting the parts, respectively, to a high voltage direct current regulator, adjusting the direct current regulator to maintain the accelerating potential of the gun at a pre-set level, feeding representative values of the voltage and the current of the electrical energy being supplied by the regulator to a multiplier, obtaining a signal which is thus proportional to the power being supplied by the electron beam to the workpiece, feeding said signal to a summing junction, feeding to said summing junction a second signal which is proportional to the power desired for the electron beam, obtaining from the summing junction an error signal representing the difference between the two signals, and utilizing the error signal to control a bias supply connected between the filament of the electron gun and the said electrode, whereby the bias voltage is automatically adjusted by said error signal so that the product of the current and the voltage of the electrical energy supplied to the parts will equal the power desired for the electron beam.

6. An electron beam welding method as defined by claim 5, wherein the step of utilizing the error signal for controlling the bias supply includes a servo motor to which the error signal is supplied and a variable transformer controlled by the servo motor and which, in turn, controls the bias supply.

7. In welding apparatus of the character described the combination with an electron gun for projecting an electron beam for welding a workpiece, said gun having a filament, an electrode, and an anode, a high voltage power regulator, a conductor connecting the positive terminal of the power regulator to the anode, other connections joining the negative terminal of the power regulator with the electrode, said last mentioned connections including a bias supply having its positive terminal connected to the filament and its negative terminal connected to the electrode, said power regulator including a variable transformer which may be adjusted for maintaining the accelerating potential of the gun at a pre-set level, an electrical multiplier, means supplying to the multiplier representative values of the voltage and the current of the electrical energy supply to the said parts, whereby to obtain a first signal from the multiplier proportional to the power being supplied by the electron beam to the workpiece, a summing junction electrically connected to the multiplier for receiving said first signal, means for feeding to the summing junction a second signal which is proportional to the power desired for the electron beam, means feeding the error signal such as may be obtained from the summing junction to a servo motor, and means interposed between the servo motor and the bias supply whereby the bias supply is regulated by the servo motor in response to the error signal so that the product of the current and the voltage of the electrical energy supplied to the parts will equal the power desired for the electron beam.

References Cited

UNITED STATES PATENTS

| | | | |
|---|---|---|---|
| 3,119,009 | 1/1964 | Zeller | 219—125 |
| 3,158,733 | 11/1964 | Sibley | 219—121 |
| 3,172,989 | 3/1965 | Nelson | 219—121 |
| 3,187,216 | 6/1965 | Sciaky | 219—121 |
| 3,192,318 | 6/1965 | Schleich et al. | 219—121 |
| 3,196,246 | 7/1965 | El-kareh | 219—121 |
| 3,209,121 | 9/1965 | Manz | 219—125 |
| 3,262,006 | 7/1966 | Sciaky et al. | 219—125 |
| 3,290,032 | 12/1966 | Brouwer | 219—125 |
| 3,301,949 | 1/1967 | Ullery | 219—121 |
| 3,371,185 | 2/1968 | Anderson | 219—121 |

RICHARD M. WOOD, *Primary Examiner.*

W. DEXTER BROOKS, *Assistant Examiner.*

U.S. Cl. X.R.

219—135